United States Patent
Coady et al.

(10) Patent No.: US 12,462,181 B2
(45) Date of Patent: *Nov. 4, 2025

(54) CORRECTING QUANTUM ERRORS BASED ON QUANTUM ERROR CORRECTION CACHES (QECCs)

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 1011 days.

This patent is subject to a terminal disclaimer.

(21) Appl. No.: 17/536,417

(22) Filed: Nov. 29, 2021

(65) Prior Publication Data

US 2023/0169387 A1    Jun. 1, 2023

(51) Int. Cl.
*G06N 10/70*    (2022.01)
*G06F 11/14*    (2006.01)

(52) U.S. Cl.
CPC .............. *G06N 10/70* (2022.01); *G06F 11/14* (2013.01)

(58) Field of Classification Search
CPC ................................ G06N 10/70; G06F 11/14
See application file for complete search history.

(56) References Cited

U.S. PATENT DOCUMENTS

| | | |
|---|---|---|
| 10,922,166 B2 | 2/2021 | Hogaboam |
| 11,106,992 B2 | 8/2021 | Kelly |
| 2020/0285539 A1 | 9/2020 | Fowler |
| 2021/0126652 A1 | 4/2021 | Delfosse et al. |

FOREIGN PATENT DOCUMENTS

CN    112734043 A    4/2021

OTHER PUBLICATIONS

Dousti, M. et al., "Squash: A Scalable Quantum Mapper Considering Ancilla Sharing," Proceedings of the 24th ACM Great Lakes Symposium on VLSI (GLSVLSI'14), May 21-23, 2014, Houston, TX, USA, ACM, 6 pages.
Kempe, J. et al., "Approaches to Quantum Error Correction," arXiv:quant-ph/0612185v1, Dec. 21, 2006, https://arxiv.org/pdf/quant-ph/0612185.pdf, 29 pages.

*Primary Examiner* — Pei Yong Weng
(74) *Attorney, Agent, or Firm* — Dority & Manning, P.A.

(57) ABSTRACT

Correcting quantum errors based on quantum error correction caches (QECCs) is disclosed herein. In one example, a processor device of a quantum computing device is to receive an indication of an occurrence of a quantum error that affects a qubit. The processor device identifies a QECC entry within a plurality of QECC entries of a first QECC of the quantum computing device, wherein the QECC entry corresponds to a previous occurrence of the quantum error. The processor device obtains metadata associated with the previous occurrence of the first quantum error from the QECC entry, and determines a corrective action based on the metadata. The processor device performs the corrective action to remedy the quantum error.

20 Claims, 7 Drawing Sheets

CORRECTING QUANTUM ERRORS BASED ON QUANTUM ERROR CORRECTION CACHES (QECCs)

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because of the inherent instability of qubits, quantum computing devices employ quantum error correction (QEC) mechanisms to detect and remedy quantum errors that may occur while executing quantum services. As quantum computing continues to increase in popularity and become more commonplace, an ability to efficiently correct quantum errors will be desirable.

SUMMARY

The examples disclosed herein correct quantum errors based on quantum error correction caches (QECCs). In one example, a QECC service, executing on a quantum computing device, provides a mechanism by which a corrective action performed by a conventional quantum error correction (QEC) service in response to a quantum error may be recorded in a QECC in association with metadata relating to the occurrence of the quantum error. Upon detecting a subsequent occurrence of the quantum error, the QECC retrieves the metadata, and determines and performs the corrective action based on the metadata without needing to invoke the functionality of the conventional QEC service.

In another example, a method for correcting quantum errors based on QECCs is disclosed. The method comprises receiving, by a first quantum computing device, an indication of an occurrence of a first quantum error that affects a first qubit. The method further comprises identifying a QECC entry within a plurality of QECC entries of a first QECC of the first quantum computing device, wherein the QECC entry corresponds to a previous occurrence of the first quantum error. The method also comprises obtaining metadata associated with the previous occurrence of the first quantum error from the QECC entry. The method additionally comprises determining a corrective action based on the metadata. The method further comprises performing the corrective action.

In another example, a first quantum computing device for correcting quantum errors based on QECCs is disclosed. The first quantum computing device comprises a first system memory and a first processor device communicatively coupled to the first system memory. The first processor device is to receive an indication of an occurrence of a first quantum error that affects a first qubit. The first processor device is further to identify a QECC entry within a plurality of QECC entries of a first QECC of the first quantum computing device, wherein the QECC entry corresponds to a previous occurrence of the first quantum error. The first processor device is also to obtain metadata associated with the previous occurrence of the first quantum error from the QECC entry. The first processor device is additionally to determine a corrective action based on the metadata. The first processor device is further to perform the corrective action.

In another example, a non-transitory computer-readable medium is disclosed. The non-transitory computer-readable medium stores thereon computer-executable instructions that, when executed, cause one or more processor devices to receive an indication of an occurrence of a first quantum error that affects a first qubit. The computer-executable instructions further cause the one or more processor devices to identify a QECC entry within a plurality of QECC entries of a first QECC of a first quantum computing device, wherein the QECC entry corresponds to a previous occurrence of the first quantum error. The computer-executable instructions also cause the one or more processor devices to obtain metadata associated with the previous occurrence of the first quantum error from the QECC entry. The computer-executable instructions additionally cause the one or more processor devices to determine a corrective action based on the metadata. The computer-executable instructions further cause the one or more processor devices to perform the corrective action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
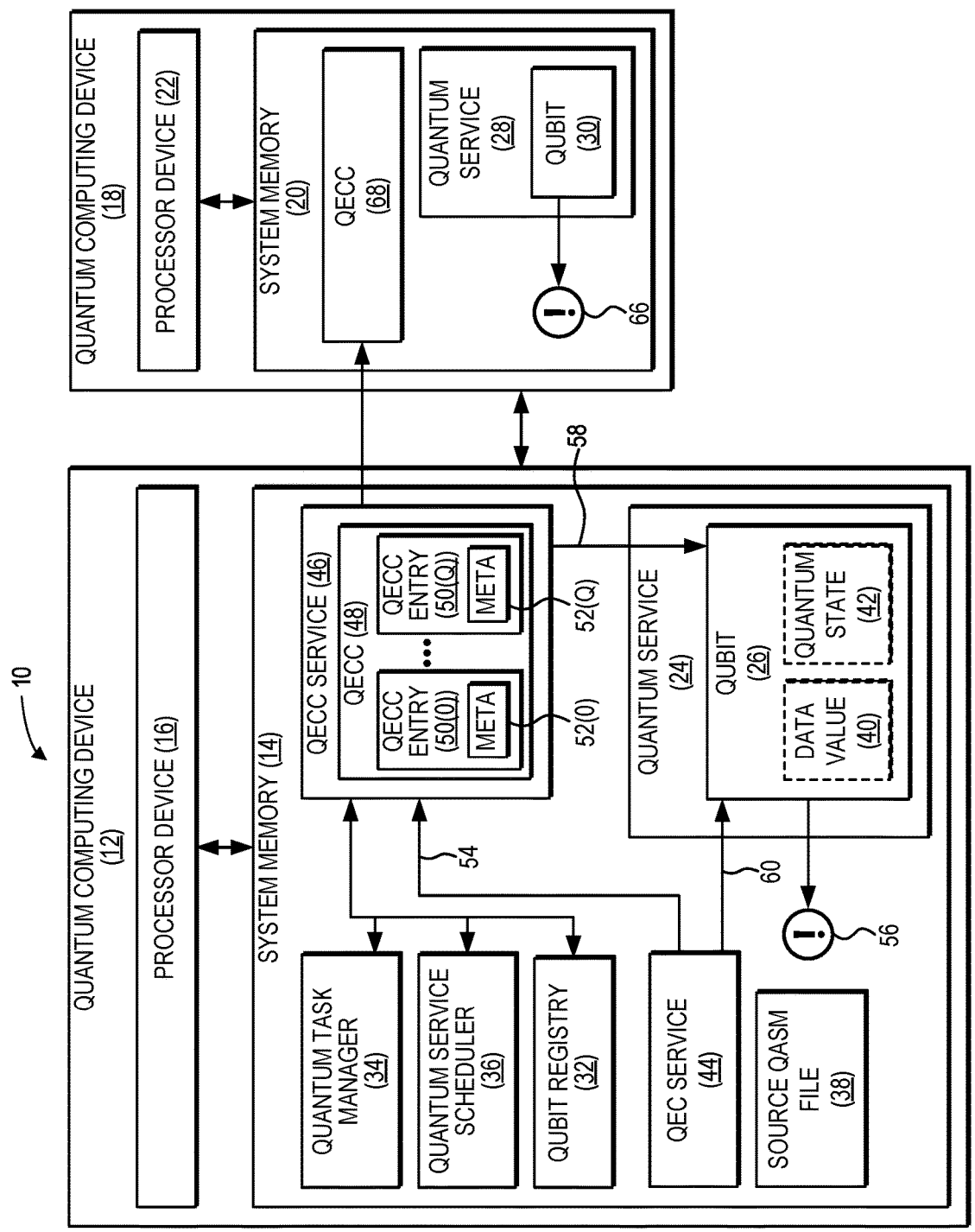
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. Qubits may be employed by quantum services that are executed by quantum computing devices. While qubits can be used to perform operations that would be impractical or impossible to perform with classical bits, qubits also suffer from inherent instabilities that may be caused by factors such as susceptibility to interference from their operating environments, faulty preparation, faulty gates, and the like. These instabilities may manifest as quantum errors, such as incorrect data values and/or quantum states, that affect the qubits.

For this reason, conventional quantum computing devices employ quantum error correction (QEC) services to detect and remedy quantum errors that may occur while executing quantum services. Such QEC services make use of a large number of additional qubits (relative to the number of qubits required to perform a quantum operation) to detect quantum errors that may occur, and to perform corrective actions. However, the allocation and maintenance of these additional qubits for quantum error detection and correction incurs additional overhead that may negatively impact the performance of a quantum computing device.

In this regard, examples disclosed herein implement a QEC cache (QECC) service for correcting quantum errors based on QECCs. In one example, a QECC service, executing on a quantum computing device, provides a QECC that stores a plurality of QECC entries. Each QECC entry within the QECC corresponds to a previous occurrence of a quantum error, and stores metadata associated with the previous occurrence of the quantum error. The metadata may include, as non-limiting examples, information relating to the quantum error itself (e.g., an indication of a quantum error type, a timestamp indicating when the quantum error occurred, and/or an indication of a corrective action taken by a QEC service to correct the quantum error), information relating to a qubit affected by the quantum error (e.g., a qubit identifier and/or a source Quantum Assembly (QASM) file identifier for the qubit), and/or information relating to the operating environment of the quantum computing device (e.g., an identifier of one or more concurrently executing quantum services, an identifier of one or more scheduled quantum services, and/or an indication of an environmental attribute).

In exemplary operation, the QECC service receives an indication of a quantum error (e.g., from a conventional QEC service) that affects a qubit. The QECC service identifies a QECC entry in the QECC that corresponds to a previous occurrence of the quantum error. Using the QECC entry, the QECC service obtains metadata associated with the previous occurrence of the quantum error, and determines a corrective action based on the metadata. The corrective action in some examples may include modifying a data value of the qubit, modifying a quantum state of the qubit, and/or modifying a source QASM file corresponding to the qubit, as non-limiting examples. After determining the corrective action, the QECC service then performs the corrective action. In some examples, the QECC service may subsequently determine whether the corrective action corrected the quantum error. If not, the QEC service of the quantum computing device may perform a QEC operation to correct the quantum error in conventional fashion.

Some examples may provide that, prior to receiving the indication of the occurrence of the quantum error, the QECC service may determine that a QEC operation has been performed by the QEC service of the quantum computing device in response to the previous occurrence of the quantum error. The QECC service may then obtain the metadata associated with the previous occurrence of the quantum error and store the metadata in the QECC entry.

According to some examples, after the QECC has been populated by the QECC service of the quantum computing device, the contents of the QECC may be shared with other quantum computing devices that may be subject to similar quantum errors encountered by the quantum computing device. In such examples, the QECC service may identify a common characteristic of the first quantum computing device and a second quantum computing device. The common characteristic may comprise, as non-limiting examples, a common characteristic shared by a first quantum service of the first quantum computing device and a second quantum service of the second quantum computing device, a common characteristic shared by the first qubit of the first quantum computing device and a second qubit of the second quantum computing device, a common characteristic shared by a first operating environment of the first quantum computing device and a second operating environment of the second quantum computing device, and/or a common characteristic of the first quantum error and a second quantum error that affects the second qubit. After identifying the common characteristic, the QECC service identifies one or more QECC entries within its local QECC that correspond to the common characteristic. The QECC service then copies the one or more QECC entries from its local QECC to a second QECC of the second quantum computing device.

FIG. 1 is a block diagram of a computing system 10 according to one example. The computing system 10 includes a quantum computing device 12 that comprises a system memory 14 and a processor device 16, and further includes a quantum computing device 18 that comprises a system memory 20 and a processor device 22. The quantum computing device 12 and the quantum computing device 18 in the example of FIG. 1 are communicatively coupled via a classical communications link (not shown), which may comprise a private network or a public network such as the internet. The quantum computing device 12 and the quantum computing device 18 may also be communicatively coupled to each other and/or to other quantum computing devices (not shown) via a quantum channel (not shown) over which qubits may be transmitted. It is to be understood that the computing system 10, according to some examples, may include more or fewer quantum computing devices and/or classical computing devices than illustrated in FIG. 1. Additionally, the quantum computing device 12 and/or the quantum computing device 18 in some examples may include constituent elements in addition to those illustrated in FIG. 1.

The quantum computing device 12 and the quantum computing device 18 in the example of FIG. 1 operate in quantum environments, but are each capable of operating using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 may operate under certain environmental conditions, such as at or near zero degrees (0°) Kelvin. When using classical computing principles, the quantum computing device 12 and the quantum computing device 18 utilize binary digits that have a value of either zero (0) or one (1).

In the example of FIG. 1, the quantum computing device 12 executes a quantum service 24, which comprises a process that employs one or more qubits such as a qubit 26 to perform quantum operations. Similarly, the quantum computing device 18 executes a quantum service 28 that employs a qubit 30. To maintain information for qubits such as the qubit 26, the quantum computing device 12 may include a qubit registry 32, which comprises a plurality of qubit registry entries (not shown) that each correspond to a qubit. The qubit registry 32 maintains and provides access to data relating to the qubits implemented by the quantum computing device 12, including a count of the total number of qubits implemented by the quantum computing device 12 and a count of the number of available qubits that are currently available for allocation, as non-limiting examples. Each of the qubit registry entries of the qubit registry 32 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 24 is facilitated by a quantum task manager 34 and a quantum service scheduler 36, each of which operates in a manner analogous to their conventional classical counterparts. Thus, the quantum task manager 34 of the quantum computing device 12 handles operations for creating, monitoring, and terminating quantum services, while the quantum service scheduler 36 of the quantum computing device 12 controls the scheduling of quantum services for execution by the processor device 16, and the allocation of processing resources to executing quantum services. The functionality of the quantum task manager 34 and the quantum service scheduler 36 may be made accessible to other services and processes (e.g., via a defined application programming interface (API), as a non-limiting example). Although not shown in FIG. 1, it is to be understood that the quantum computing device 18 in some examples implements functionality corresponding to the qubit registry 32, the quantum task manager 34, and the quantum service scheduler 36 of the quantum computing device 12.

The quantum service 24 may be associated with a source QASM file 38, which provides quantum programming instructions that define the quantum service 24 and that configure and manipulate the qubit 26. The qubit 26 of the quantum service 24 may be used to store a data value 40 and/or may have a quantum state 42 (e.g., spin, as a non-limiting example) into which the qubit 26 is programmatically placed.

As noted above, qubits such as the qubit 26 suffer from inherent instabilities that are caused by factors such as susceptibility to interference from the operating environment of the quantum computing device 12 (e.g., by electronic noise generated by operation of the quantum computing device 12, temperature fluctuations within the quantum computing device 12, interference generated by other executing quantum services, and the like), as well as by faulty preparation, faulty gates, and other issues. These instabilities may manifest as a quantum error that affects the qubit 26 by, for example, incorrectly changing the data value 40 and/or the quantum state 42 of the qubit 26. To detect and correct such quantum errors, the quantum computing device 12 provides a QEC service 44. The QEC service 44 may use multiple error correcting qubits (not shown), placed in an entangled state with qubits such as the qubit 26, to detect and remedy quantum errors. However, the additional overhead incurred by allocating and managing the additional qubits required by the QEC service 44 may negatively impact the performance of the quantum computing device 12.

In this regard, the quantum computing device 12 of FIG. 1 implements a QECC service 46 for correcting quantum errors using a QECC 48. The QECC 48 is implemented in a manner analogous to a conventional cache or database table, and includes a plurality of QECC entries 50(0)-50(Q), each of which corresponds to a previous occurrence of a quantum error. The QECC entries 50(0)-50(Q) store metadata (captioned as "META" in FIG. 1) 52(0)-52(Q), respectively, that is associated with each corresponding previous occurrence of a quantum error, and that is obtained by the QECC service 46 (e.g., from the QEC service 44) when a quantum error is detected (e.g., by the QEC service 44). The metadata 52(0)-52(Q) each may be stored as binary or textual data, or a combination thereof.

In some examples, the metadata 52(0)-52(Q) may include information relating to each corresponding quantum error itself, such as an indication of a quantum error type, a timestamp indicating when the quantum error occurred, and/or an indication of a corrective action taken by the QEC service 44 to correct the quantum error. Some examples may provide that the metadata 52(0)-52(Q) may include information relating to a qubit affected by each corresponding quantum error, such as a qubit identifier and/or a source QASM file identifier for the qubit. According to some examples, the metadata 52(0)-52(Q) may include information relating to the operating environment of the quantum computing device 12, such as an identifier of one or more concurrently executing quantum services, an identifier of one or more scheduled quantum services, and/or an indication of an environmental attribute of the quantum computing device 12 (e.g., an operating temperature at a particular point in time).

In exemplary operation, the QECC service 46 receives an indication 54 of a quantum error 56 that affects the qubit 26. The indication 54 in some examples may be provided by the QEC service 44 in response to a query from the QECC service 46 or a subscription by the QECC service 46 to updates from the QEC service 44. Using the indication 54, the QECC service 46 identifies a QECC entry, such as the QECC entry 50(0), in the QECC 48 that corresponds to a previous occurrence of the quantum error 56. Identifying the QECC entry 50(0) may be based on, e.g., a type of the quantum error 56, an identity of the qubit 26 affected by the quantum error 56, and/or a time interval during which the quantum error 56 occurred, as non-limiting examples.

Using the QECC entry 50(0), the QECC service 46 next obtains the metadata 52(0), which is associated with the previous occurrence of the quantum error 56. Based on the metadata 52(0), the QECC service 46 determines a corrective action 58 to perform to correct the quantum error 56 without invoking the functionality of the QEC service 44. The corrective action 58 according to some examples may comprise modifying the data value 40 of the qubit 26, modifying the quantum state 42 of the qubit 26, and/or modifying the source QASM file 38 corresponding to the qubit 26, as non-limiting examples. The QECC service 46 in some examples may determine the corrective action 58 by using the metadata 52(0) to identify a corrective action that successfully corrected the previous occurrence of the quantum error 56, and then determining that corrective action to be the corrective action 58 based on the identification. Some examples may provide that the QECC service 46 determines the corrective action 58 by using the metadata 52(0) to identify a corrective action that did not successfully correct the previous occurrence of the quantum error 56, and, based on the identification, determining a different corrective action to be the corrective action 58. After determining the corrective action 58, the QECC service 46 then performs the corrective action 58.

In some examples, the QECC service 46, after performing the corrective action 58, may determine whether the corrective action 58 corrected the quantum error 56 affecting the qubit 26. If the corrective action 58 was not successful in correcting the quantum error 56, the QEC service 44 of the quantum computing device 12 may perform a QEC operation 60 to correct the quantum error 56 in conventional fashion.

According to some examples, the QECC service 46, prior to receiving the indication 54 of the occurrence of the quantum error 56, may determine that a QEC operation (not shown) has been performed by the QEC service 44 of the quantum computing device 12 in response to the previous occurrence of the quantum error 56. The QECC service 46 may then obtain the metadata 52(0) associated with the previous occurrence of the quantum error 56, and store the metadata 52(0) in the QECC entry 50(0).

Some examples may provide that, after the QECC 48 has been populated by the QECC service 46, the contents of the QECC 48 may be shared with other quantum computing devices, such as the quantum computing device 18, that may be subject to quantum errors similar to those encountered by the quantum computing device 12 based on a common characteristic shared by the quantum computing device 12 and the quantum computing device 18. The common characteristic may comprise, as non-limiting examples, a common characteristic shared by the quantum service 24 of the quantum computing device 12 and the quantum service 28 of the quantum computing device 18, a common characteristic shared by the qubit 26 of the quantum computing device 12 and the qubit 30 of the quantum computing device 18, a common characteristic shared by the operating environment of the quantum computing device 12 and the operating environment of the quantum computing device 18 (e.g., temperature, geographic location, and the like), and/or a common characteristic of the quantum error 56 and a quantum error 66 that affects the qubit 30. In such examples, the QECC service 46 identifies the common characteristic of the quantum computing device 12 and the quantum computing device 18, and, based on the common characteristic, identifies one or more QECC entries (e.g., the QECC entry 50(Q), as a non-limiting example) within the QECC 48 that correspond to the common characteristic. The QECC service 46 then copies the one or more QECC entries 50(Q) from the QECC 48 to a QECC 68 of the quantum computing device 18.

It is to be understood that, because the QECC service 46 is a component of the quantum computing device 12, functionality implemented by the QECC service 46 may be attributed to the computing system 10 generally. Moreover, in examples where the QECC service 46 comprises software instructions that program the processor device 16 to carry out functionality discussed herein, functionality implemented by the QECC service 46 may be attributed herein to the processor device 16. It is to be further understood that while, for purposes of illustration only, the QECC service 46 is depicted as a single component, the functionality implemented by the QECC service 46 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
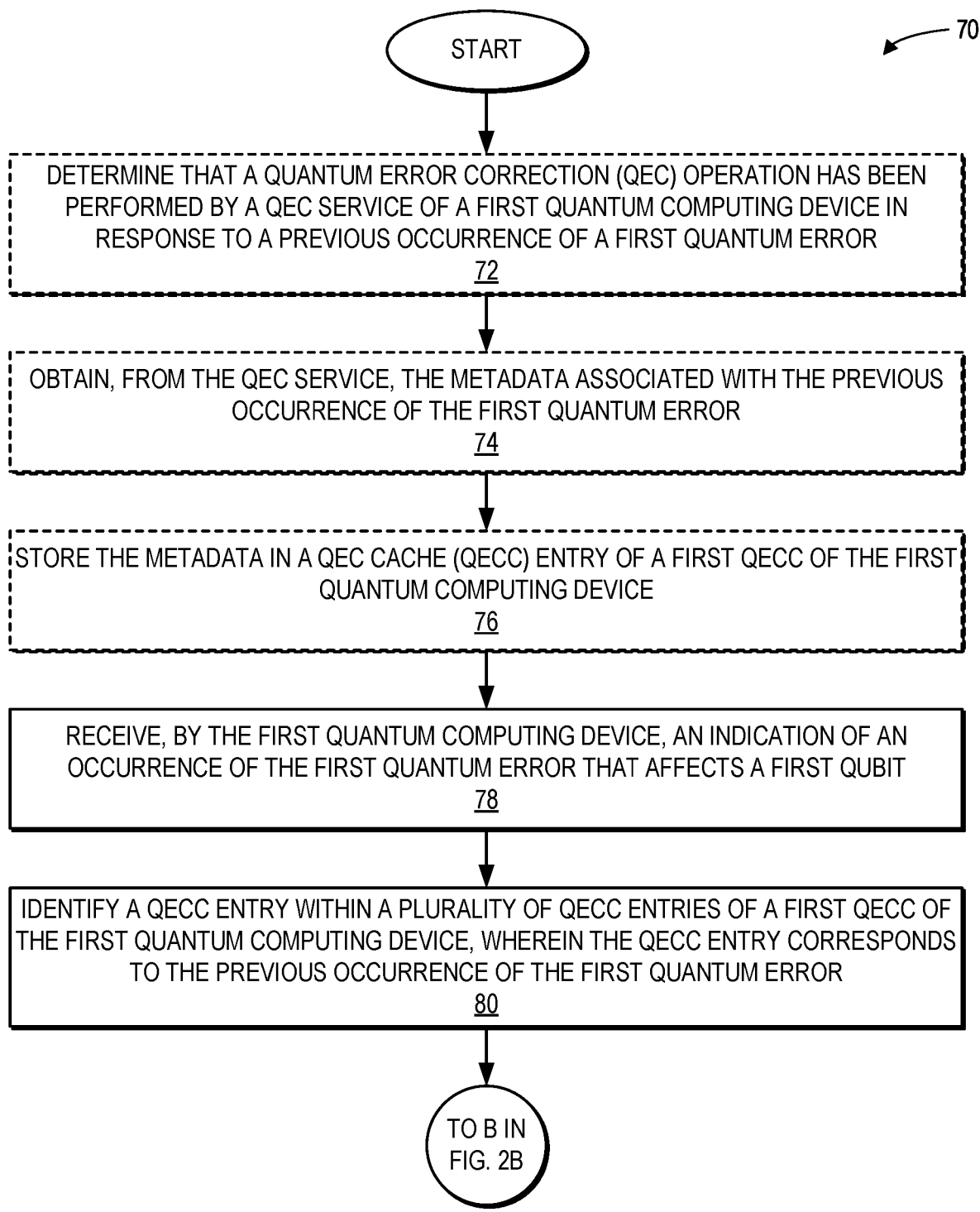
FIGS. 2A-2C are flowcharts illustrating operations performed by the computing system of FIG. 1 for correcting quantum errors based on quantum error correction caches (QECCs), according to one example.
Figure 2B:
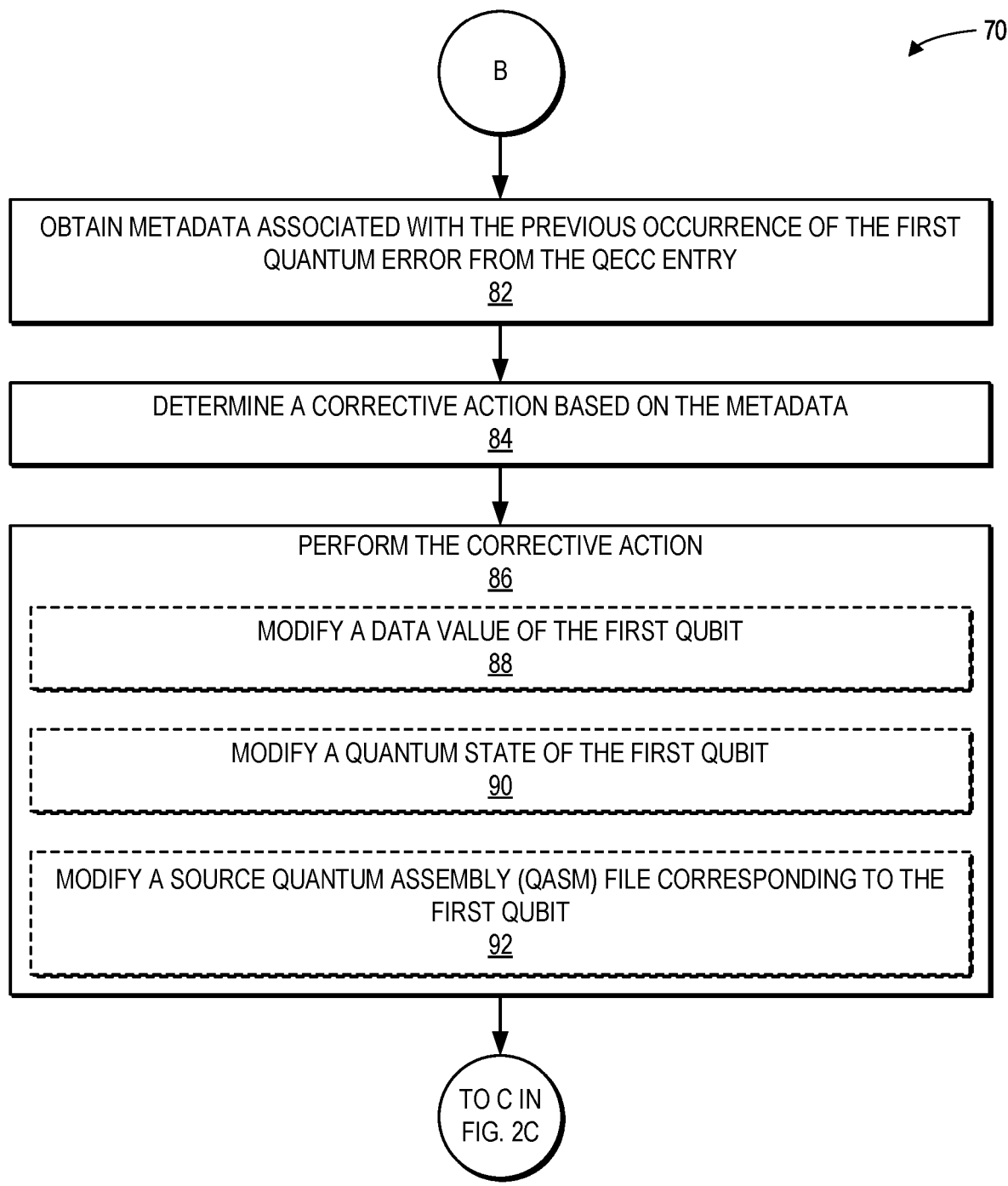
Figure 2C:
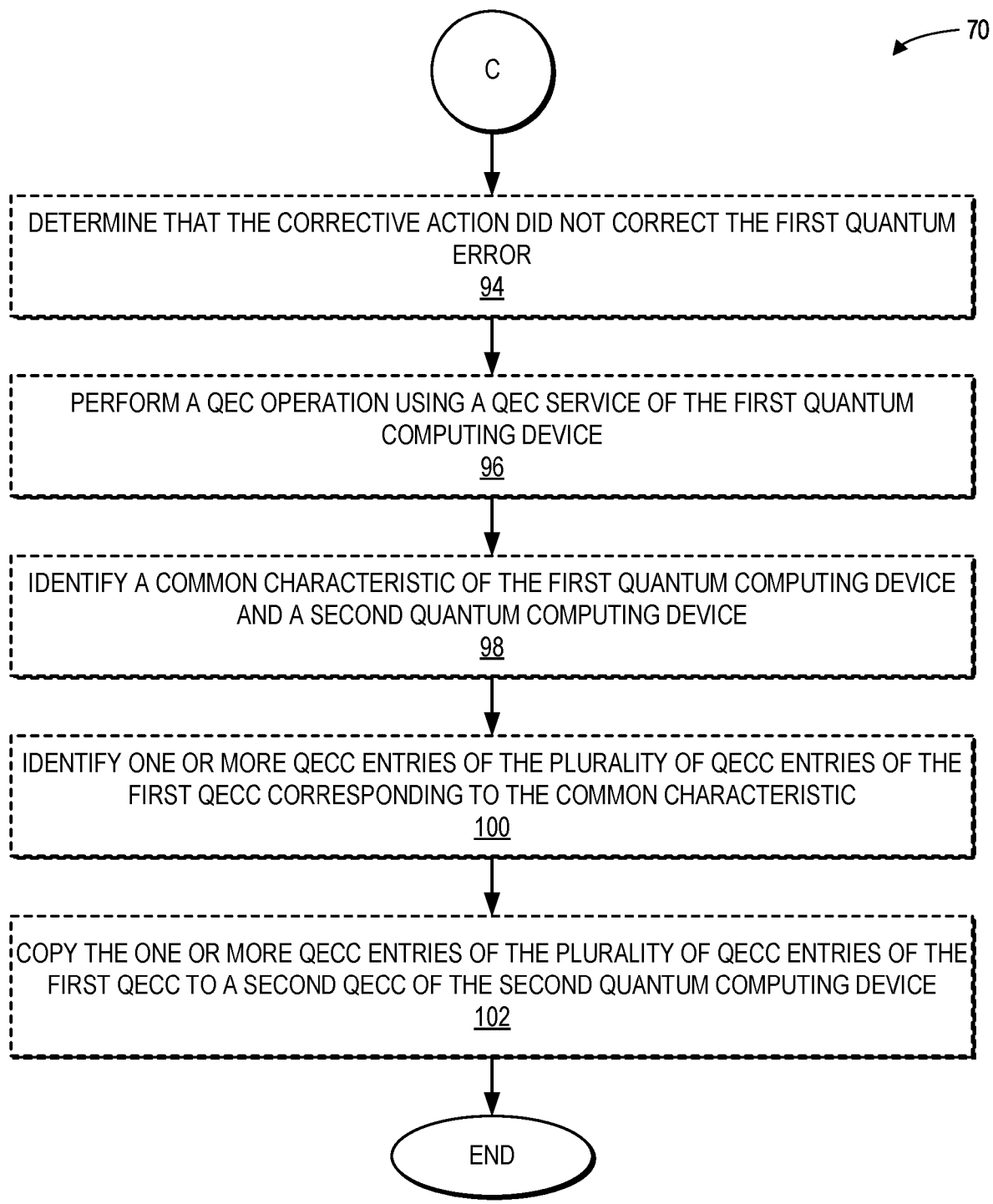

FIGS. 2A-2C provide a flowchart 70 to illustrate exemplary operations performed by the computing system 10 of FIG. 1 for correcting quantum errors based on QECCs according to one example. For the sake of clarity, elements of FIG. 1 are referenced in describing FIGS. 2A-2C. It is to be understood that, in some examples, some operations illustrated in FIGS. 2A-2C may be performed in an order other than illustrated herein, and/or may be omitted.

Operations in FIG. 2A begin in some examples with the processor device 16 of the quantum computing device 12 (e.g., by executing the QECC service 46 of FIG. 1) determining that a QEC operation (e.g., the QEC operation 60 of FIG. 1) has been performed by a QEC service of a first quantum computing device, such as the QEC service 44 of the quantum computing device 12 of FIG. 1, in response to a previous occurrence of a first quantum error (e.g., the quantum error 56 of FIG. 1) (block 72). The processor device 16 in such examples obtains, from the QEC service 44, metadata, such as the metadata 52(0) of FIG. 1, associated with the previous occurrence of the first quantum error 56 (block 74). The processor device 16 then stores the metadata 52(0) in a QECC entry of a first QECC (e.g., the QECC entry 50(0) of the QECC 48 of FIG. 1) of the first quantum computing device 12 (block 76).

The processor device 16 receives an indication, such as the indication 54 of FIG. 1, of an occurrence of the first quantum error 56 that affects a first qubit, such as the qubit 26 of FIG. 1 (block 78). In some examples, the indication 54 may be provided by the QEC service 44 of FIG. 1 to the QECC service 46. The processor device 16 identifies the QECC entry 50(0) within the plurality of QECC entries 50(0)-50(Q) of the first QECC 48 of the first quantum computing device 12, wherein the QECC entry 50(0) corresponds to the previous occurrence of the first quantum error 56 (block 80). Operations then resume at block 82 of FIG. 2B.

Turning now to FIG. 2B, the processor device 16 obtains the metadata 52(0) associated with the previous occurrence of the first quantum error 56 from the QECC entry 50(0) (block 82). Based on the metadata 52(0), the processor device 16 determines a corrective action, such as the corrective action 58 of FIG. 1 (block 84). The processor device 16 then performs the corrective action 58 (block 86). In some examples, the operations of block 86 for performing the corrective action 58 may comprise modifying a data value of the first qubit 26, such as the data value 40 of FIG.

1 (block 88). Some examples may provide that the operations of block 86 for performing the corrective action 58 comprise modifying a quantum state of the first qubit 26, such as the quantum state 42 of FIG. 1 (block 90). According to some examples, the operations of block 86 for performing the corrective action 58 may comprise modifying a source QASM file, such as the source QASM file 38 of FIG. 1, corresponding to the first qubit 26 (block 92). Operations in some examples may continue at block 94 of FIG. 2C.

Referring now to FIG. 2C, some examples may provide that the processor device 16 determines that the corrective action 58 did not correct the first quantum error 56 (block 94). In such examples, the processor device 16 may perform a QEC operation, such as the QEC operation 60 of FIG. 1, using the QEC service 44 of the first quantum computing device 12 (block 96). According to some examples, the processor device 16 may identify a common characteristic of the first quantum computing device 12 and a second quantum computing device, such as the quantum computing device 18 of FIG. 1 (block 98). The processor device 16 may next identify one or more QECC entries of the plurality of QECC entries 50(0)-50(Q) of the first QECC 48, such as the QECC entry 50(Q) of FIG. 1, corresponding to the common characteristic (block 100). The processor device 16 may then copy the one or more QECC entries 50(Q) of the plurality of QECC entries 50(0)-50(Q) of the first QECC 48 to a second QECC, such as the QECC 68 of FIG. 1, of the second quantum computing device 18 (block 102).

Figure 3:
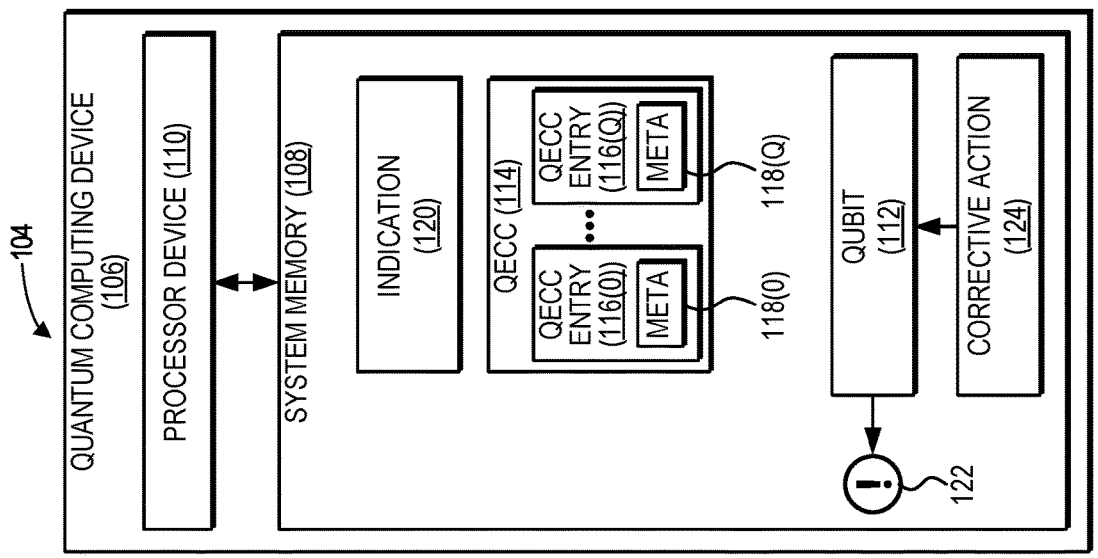
FIG. 3 is a simpler block diagram of the computing system of FIG. 1 for correcting quantum errors based on QECCs, according to one example.

FIG. 3 is a simpler block diagram of the computing system 10 of FIG. 1 for correcting quantum errors based on QECCs, according to one example. In the example of FIG. 3, a computing system 104 includes a quantum computing device 106 that comprises a system memory 108 and a processor device 110. The quantum computing device 106 provides a qubit 112 for use in performing quantum operations, and further provides a QECC 114 comprising a plurality of QECC entries 116(0)-116(Q) that store corresponding metadata 118(0)-118(Q) associated with previous occurrences of quantum errors.

In exemplary operation, the processor device 110 of the quantum computing device 106 receives an indication 120 of a quantum error 122 that affects the qubit 112. The processor device 110 identifies a QECC entry 116(0) of the plurality of QECC entries 116(0)-116(Q) of the QECC 114 that corresponds to a previous occurrence of the quantum error 122. Using the QECC entry 116(0), the processor device 110 obtains the metadata 118(0), which is associated with the previous occurrence of the quantum error 122. Based on the metadata 118(0), the processor device 110 determines a corrective action 124 to perform to correct the quantum error 122, and then performs the corrective action 124.

Figure 4:
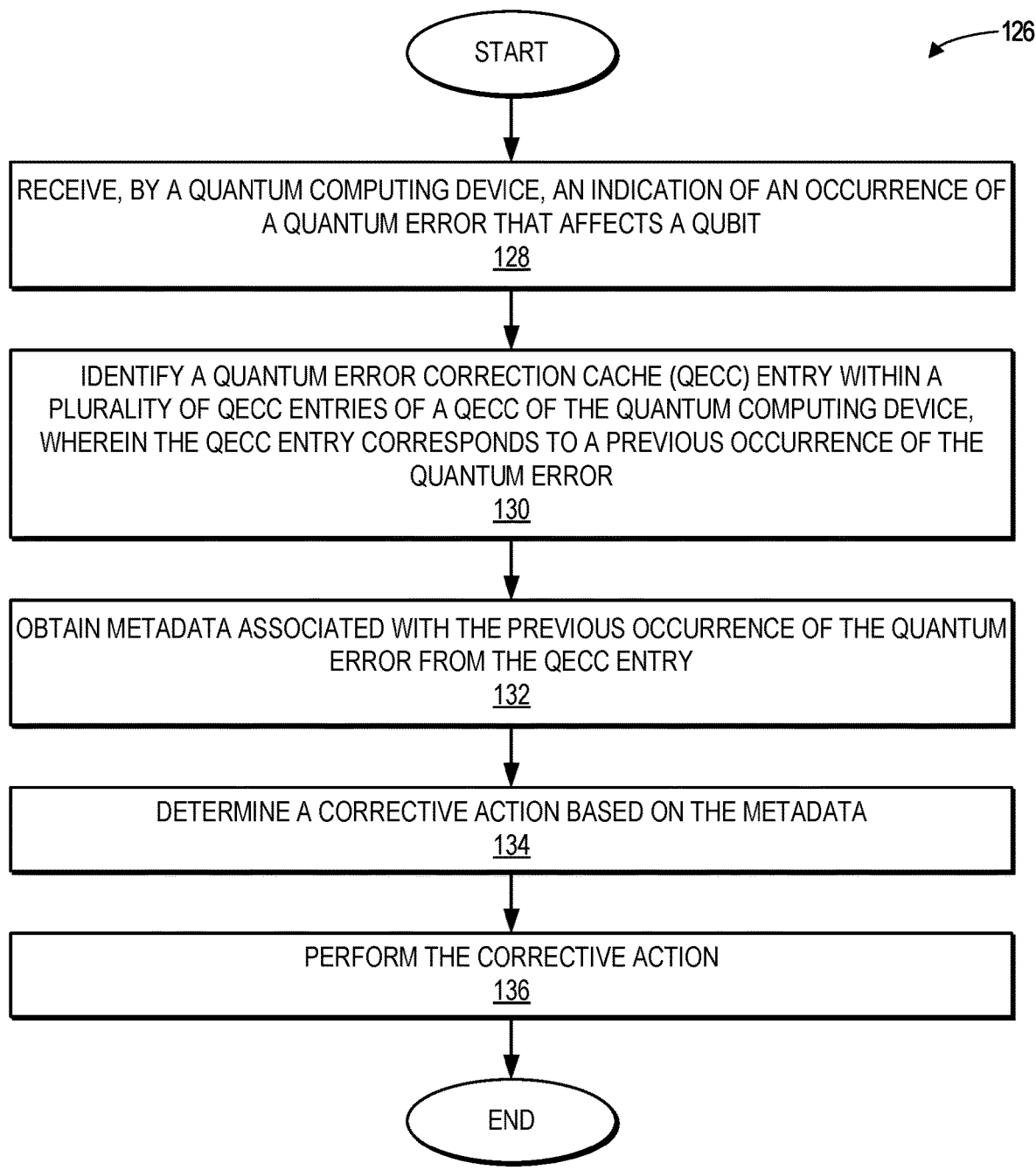
FIG. 4 is a flowchart of a simplified method for correcting quantum errors based on QECCs by the quantum computing device of FIG. 3, according to one example.

To illustrate a simplified method for correcting quantum errors based on QECCs by the quantum computing device 106 of FIG. 3 according to one example, FIG. 4 provides a flowchart 126. Elements of FIG. 3 are referenced in describing FIG. 4 for the sake of clarity. In FIG. 4, operations begin with the processor device 110 of the quantum computing device 106 receiving the indication 120 of an occurrence of the quantum error 122 that affects the qubit 112 (block 128). The processor device 110 identifies the QECC entry 116(0) within the plurality of QECC entries 116(0)-116(Q) of the QECC 114 of the quantum computing device 106, wherein the QECC entry 116(0) corresponds to a previous occurrence of the quantum error 122 (block 130). The processor device 110 next obtains the metadata 118(0) associated with the previous occurrence of the first quantum error 122 from the QECC entry 116(0) (block 132). The processor device 110 then determines the corrective action 124 based on the metadata 118(0) (block 134). Finally, the processor device 110 performs the corrective action 124 (block 136).

Figure 5:
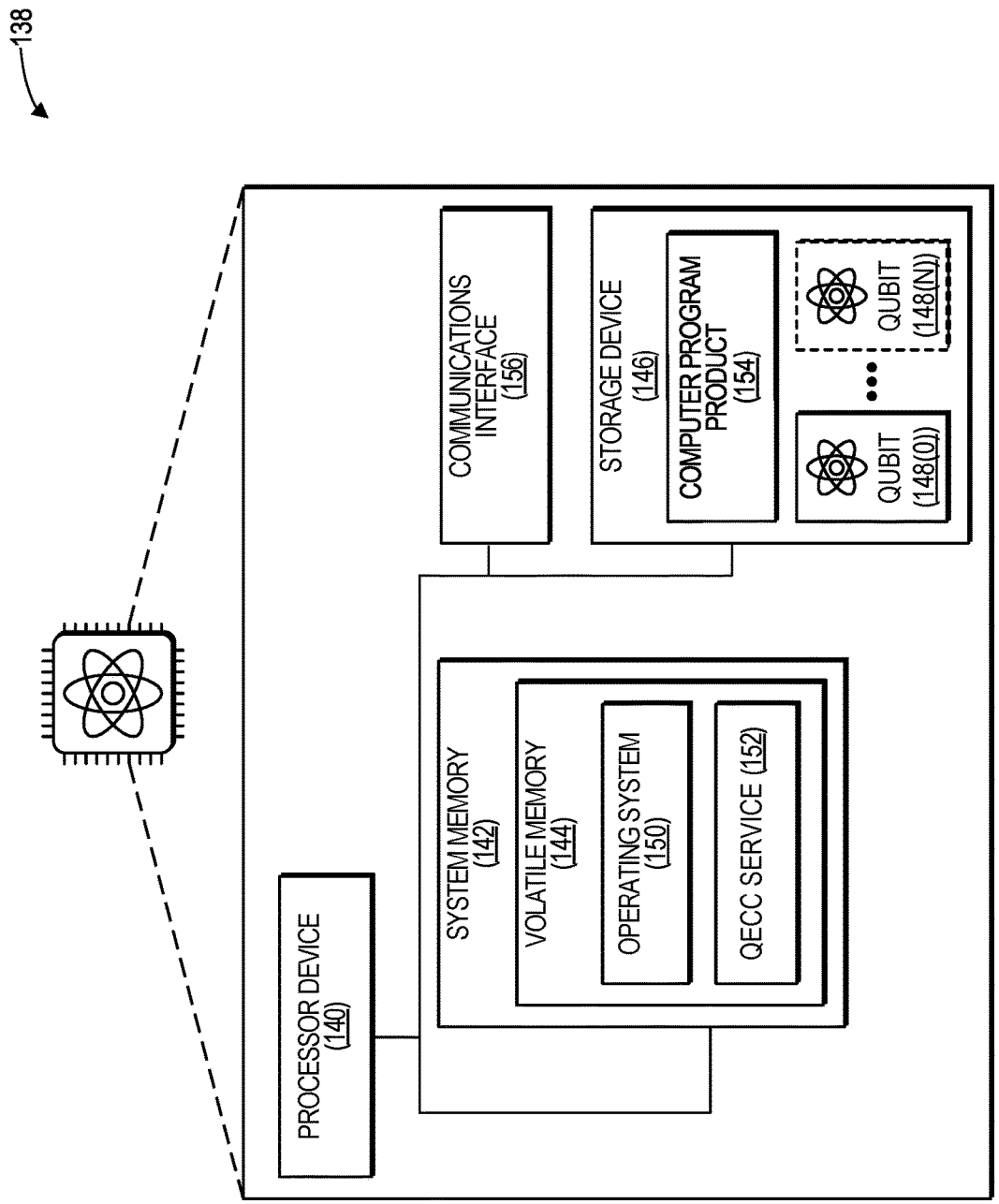
FIG. 5 is a block diagram of a quantum computing device suitable for implementing examples, according to one example.

FIG. 5 is a block diagram of a quantum computing device 138, such as the quantum computing device 12 of FIG. 1, suitable for implementing examples according to one example. The quantum computing device 138 may comprise any suitable quantum computing device or devices. The quantum computing device 138 can operate using classical computing principles or quantum computing principles. When using quantum computing principles, the quantum computing device 138 performs computations that utilize quantum-mechanical phenomena, such as superposition and entanglement. The quantum computing device 138 may operate under certain environmental conditions, such as at or near zero degrees (0°) Kelvin. When using classical computing principles, the quantum computing device 138 utilizes binary digits that have a value of either zero (0) or one (1).

The quantum computing device 138 includes a processor device 140 and a system memory 142. The processor device 140 can be any commercially available or proprietary processor suitable for operating in a quantum environment. The system memory 142 may include volatile memory 144 (e.g., random-access memory (RAM)). The quantum computing device 138 may further include or be coupled to a non-transitory computer-readable medium such as a storage device 146. The storage device 146 and other drives associated with computer-readable media and computer-usable media may provide non-volatile storage of data, data structures, computer-executable instructions, and the like. The storage device may also provide functionality for storing one or more qubits 148(0)-148(N).

A number of modules can be stored in the storage device 146 and in the volatile memory 144, including an operating system 150 and one or more modules, such as a QECC service 152. All or a portion of the examples may be implemented as a computer program product 154 stored on a transitory or non-transitory computer-usable or computer-readable medium, such as the storage device 146, which includes complex programming instructions, such as complex computer-readable program code, to cause the processor device 140 to carry out the steps described herein. Thus, the computer-readable program code can comprise computer-executable instructions for implementing the functionality of the examples described herein when executed on the processor device 140.

An operator may also be able to enter one or more configuration commands through a keyboard (not illustrated), a pointing device such as a mouse (not illustrated), or a touch-sensitive surface such as a display device (not illustrated). The quantum computing device 138 may also include a communications interface 156 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:
1. A method, comprising:
receiving, by a first quantum computing device, an indication of an occurrence of a first quantum error that affects a first qubit;

identifying a quantum error correction cache (QECC) entry within a plurality of QECC entries of a first QECC of the first quantum computing device, wherein the QECC entry corresponds to a previous occurrence of the first quantum error;

obtaining metadata associated with the previous occurrence of the first quantum error from the QECC entry;

determining a corrective action based on the metadata; and performing the corrective action.

2. The method of claim 1, wherein the metadata comprises one or more of:
an indication of a quantum error type;
a timestamp;
a qubit identifier;
an indication of the corrective action;
a source Quantum Assembly (QASM) file identifier;
an identifier of one or more concurrently executing quantum services;
an identifier of one or more scheduled quantum services; and
an indication of an environmental attribute of the first quantum computing device.

3. The method of claim 1, wherein the corrective action comprises one or more of modifying a data value of the first qubit, modifying a quantum state of the first qubit, and modifying a source Quantum Assembly (QASM) file corresponding to the first qubit.

4. The method of claim 1, further comprising, prior to receiving the indication of the occurrence of the first quantum error:
determining that a quantum error correction (QEC) operation has been performed by a QEC service of the first quantum computing device in response to the previous occurrence of the first quantum error;
obtaining, from the QEC service, the metadata associated with the previous occurrence of the first quantum error; and
storing the metadata in the QECC entry.

5. The method of claim 1, further comprising:
determining that the corrective action did not correct the first quantum error; and
performing a quantum error correction (QEC) operation using a QEC service of the first quantum computing device.

6. The method of claim 1, further comprising:
identifying a common characteristic of the first quantum computing device and a second quantum computing device;
identifying one or more QECC entries of the plurality of QECC entries of the first QECC corresponding to the common characteristic; and
copying the one or more QECC entries of the plurality of QECC entries of the first QECC to a second QECC of the second quantum computing device.

7. The method of claim 6, wherein the common characteristic comprises:
a common characteristic shared by a first quantum service of the first quantum computing device and a second quantum service of the second quantum computing device;
a common characteristic shared by the first qubit of the first quantum computing device and a second qubit of the second quantum computing device;
a common characteristic shared by a first operating environment of the first quantum computing device and a second operating environment of the second quantum computing device; and
a common characteristic of the first quantum error and a second quantum error that affects the second qubit.

8. A first quantum computing device comprising:
a first system memory; and
a first processor device communicatively coupled to the first system memory, the first processor device to:
receive an indication of an occurrence of a first quantum error that affects a first qubit;
identify a quantum error correction cache (QECC) entry within a plurality of QECC entries of a first QECC of the first quantum computing device, wherein the QECC entry corresponds to a previous occurrence of the first quantum error;
obtain metadata associated with the previous occurrence of the first quantum error from the QECC entry;
determine a corrective action based on the metadata; and
perform the corrective action.

9. The first quantum computing device of claim 8, wherein the metadata comprises one or more of:
an indication of a quantum error type;
a timestamp;
a qubit identifier;
an indication of the corrective action;
a source Quantum Assembly (QASM) file identifier;
an identifier of one or more concurrently executing quantum services;
an identifier of one or more scheduled quantum services; and
an indication of an environmental attribute of the first quantum computing device.

10. The first quantum computing device of claim 8, wherein the corrective action comprises one or more of modifying a data value of the first qubit, modifying a quantum state of the first qubit, and modifying a source Quantum Assembly (QASM) file corresponding to the first qubit.

11. The first quantum computing device of claim 8, wherein the first processor device is further to, prior to receiving the indication of the occurrence of the first quantum error:
determine that a quantum error correction (QEC) operation has been performed by a QEC service of the first quantum computing device in response to the previous occurrence of the first quantum error;
obtain, from the QEC service, the metadata associated with the previous occurrence of the first quantum error; and
store the metadata in the QECC entry.

12. The first quantum computing device of claim 8, wherein the first processor device is further to:
determine that the corrective action did not correct the first quantum error; and
perform a quantum error correction (QEC) operation using a QEC service of the first quantum computing device.

13. The first quantum computing device of claim 8, wherein the first processor device is further to:
identify a common characteristic of the first quantum computing device and a second quantum computing device;
identifying one or more QECC entries of the plurality of QECC entries of the first QECC corresponding to the common characteristic; and copying the one or more QECC entries of the plurality of QECC entries of the first QECC to a second QECC of the second quantum computing device.

14. The first quantum computing device of claim 13, wherein the common characteristic comprises:
   a common characteristic shared by a first quantum service of the first quantum computing device and a second quantum service of the second quantum computing device;
   a common characteristic shared by the first qubit of the first quantum computing device and a second qubit of the second quantum computing device;
   a common characteristic shared by a first operating environment of the first quantum computing device and a second operating environment of the second quantum computing device; and
   a common characteristic of the first quantum error and a second quantum error that affects the second qubit.

15. A non-transitory computer-readable medium having stored thereon computer-executable instructions that, when executed, cause one or more processor devices to:
   receive an indication of an occurrence of a first quantum error that affects a first qubit;
   identify a quantum error correction cache (QECC) entry within a plurality of QECC entries of a first QECC of a first quantum computing device, wherein the QECC entry corresponds to a previous occurrence of the first quantum error;
   obtain metadata associated with the previous occurrence of the first quantum error from the QECC entry;
   determine a corrective action based on the metadata; and
   perform the corrective action.

16. The non-transitory computer-readable medium of claim 15, wherein the metadata comprises one or more of:
   an indication of a quantum error type;
   a timestamp;
   a qubit identifier;
   an indication of the corrective action;
   a source Quantum Assembly (QASM) file identifier;
   an identifier of one or more concurrently executing quantum services;
   an identifier of one or more scheduled quantum services; and
   an indication of an environmental attribute of the first quantum computing device.

17. The non-transitory computer-readable medium of claim 15, wherein the corrective action comprises one or more of modifying a data value of the first qubit, modifying a quantum state of the first qubit, and modifying a source Quantum Assembly (QASM) file corresponding to the first qubit.

18. The non-transitory computer-readable medium of claim 15, wherein the computer-executable instructions further cause the one or more processor devices to, prior to receiving the indication of the occurrence of the first quantum error:
   determine that a quantum error correction (QEC) operation has been performed by a QEC service of the first quantum computing device in response to the previous occurrence of the first quantum error;
   obtain, from the QEC service, the metadata associated with the previous occurrence of the first quantum error; and
   store the metadata in the QECC entry.

19. The non-transitory computer-readable medium of claim 15, wherein the computer-executable instructions further cause the one or more processor devices to:
   identify a common characteristic of the first quantum computing device and a second quantum computing device;
   identifying one or more QECC entries of the plurality of QECC entries of the first QECC corresponding to the common characteristic; and
   copying the one or more QECC entries of the plurality of QECC entries of the first QECC to a second QECC of the second quantum computing device.

20. The non-transitory computer-readable medium of claim 19, wherein the common characteristic comprises:
   a common characteristic shared by a first quantum service of the first quantum computing device and a second quantum service of the second quantum computing device;
   a common characteristic shared by the first qubit of the first quantum computing device and a second qubit of the second quantum computing device;
   a common characteristic shared by a first operating environment of the first quantum computing device and a second operating environment of the second quantum computing device; and
   a common characteristic of the first quantum error and a second quantum error that affects the second qubit.

* * * * *